United States Patent [19]
Morton

[11] Patent Number: 5,786,902
[45] Date of Patent: Jul. 28, 1998

[54] PHOTOGRAPHIC PRINTER AND METHOD OF DIGITALLY CORRECTING FOR A PHOTOGRAPHIC PRINTER

[75] Inventor: Roger Roy Adams Morton, Penfield, N.Y.

[73] Assignee: Eastman Kodak Company, Rochester, N.Y.

[21] Appl. No.: 715,208

[22] Filed: Sep. 17, 1996

[51] Int. Cl.$^6$ .............................. G03B 27/80; G03B 27/32
[52] U.S. Cl. .............................. 358/475; 358/406; 355/77; 355/83
[58] Field of Search .............................. 355/83, 67, 77; 358/448, 450, 504, 518, 527, 406, 475, 482, 483, 446, 461, 520; 399/217, 221, 194

[56] References Cited

U.S. PATENT DOCUMENTS

| | | | |
|---|---|---|---|
| 4,059,481 | 11/1977 | Nagano | 156/660 |
| 4,286,868 | 9/1981 | Laska | 355/68 |
| 4,394,089 | 7/1983 | McIntosh et al. | 355/88 |
| 4,472,047 | 9/1984 | Stoudt | 355/4 |
| 4,575,222 | 3/1986 | Ahern et al. | 355/4 |
| 4,933,777 | 6/1990 | Hsieh et al. | 358/461 D X |
| 5,038,225 | 8/1991 | Maeshima | 358/461 |
| 5,187,595 | 2/1993 | Kitani et al. | 358/482 |
| 5,278,674 | 1/1994 | Webb et al. | 358/475 |
| 5,282,053 | 1/1994 | Robideau | 358/406 |
| 5,285,293 | 2/1994 | Webb et al. | 358/471 |
| 5,371,613 | 12/1994 | Arimoto et al. | 358/461 |
| 5,404,232 | 4/1995 | Selby | 358/406 |
| 5,414,536 | 5/1995 | Kobayashi | 358/504 |
| 5,523,861 | 6/1996 | Tanaka et al. | 358/475 |
| 5,559,612 | 9/1996 | Kanemitsu | 358/475 X |
| 5,703,700 | 12/1997 | Birgmeir et al. | 358/475 X |

*Primary Examiner*—Arthur T. Grimley
*Assistant Examiner*—Shival P. Virmani
*Attorney, Agent, or Firm*—Gordon M. Stewart

[57] ABSTRACT

A method of improving uneven illumination in a photographic printer having an original image position and a light source to illuminate the original image position, and an exposure position at which a light sensitive element is positioned for exposure, wherein the exposure position may have an inherent non-uniform illumination absent the original image, the method comprising:

inputting into a computer, data representative of illumination at multiple laterally spaced locations positioned in a direction from the light source to the exposure position;

processing the data in the computer to form an illumination correction function with a visually indistinguishable resolution.

The illumination correction function is typically applied to an original image signal so that when the original image is printed and positioned at the original image position, the inherent non-uniform illumination at the exposure position is reduced. This corrected original image is then typically printed on a support.

20 Claims, 3 Drawing Sheets

PHOTOGRAPHIC PRINTER AND METHOD OF DIGITALLY CORRECTING FOR A PHOTOGRAPHIC PRINTER

FIELD OF THE INVENTION

The invention relates generally to the field of printing images, particularly integral images, using photographic printing, and particularly using contact printing.

BACKGROUND OF THE INVENTION

It is well known to copy an original image using a photographic printing technique in which a photosensitive element is exposed to light from the original image. In contact printing an original image is printed by positioning a light sensitive element in contact with an original transparency carrying the image, so that light from a light source passes through the original image onto the light sensitive element. Since no lens systems are required and the original image is adjacent the light sensitive element, the print exhibits very low degradation from the original image.

Contact printing then, is particularly desirable in cases where it is necessary to maintain a very high resolution in the print. There are many uses of contact printing in the areas of high quality film and lithographic reproduction for images, circuit boards and integrated cicuits. Another example is in the printing of integral images. Failure to maintain a high resolution may cause individual image segments or line segments, to overlap in the print leading to an undesirable image.

Integral image elements themselves are well known. For example, known integral image elements include those which use a lenticular lens sheet, fly's eye lens sheet, or barrier strip sheet and a three-dimensional integral image aligned with the sheet, so that a user can view the three-dimensional image without any special glasses or other equipment. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following U.S. Pat. Nos. 5,391,254; 5,424,533; 5,241,608; 5,455,689; 5,276,478; 5,391,254; 5,424,533 and others; as well as allowed U.S. patent application Ser. No. 07/931,744. Integral image elements with lenticular lens sheets use what is referenced as a lenticular image having interlaced vertical image slices which. In the case of a three-dimensional lenticular image, these image slices are aligned with the lenticules so that a three-dimensional image is viewable when the lenticules are vertically oriented with respect to a viewer's eyes. The image may be conveniently laminated (that is, adhered) to an integral or lenticular lens sheet. Similar integral image elements, such as described in U.S. Pat. Nos. 3,268,238 and 3,538,632, can be used to convey a number of individual two-dimensional scenes (such as unrelated scenes or a sequence of scenes depicting motion) rather than one or more three-dimensional images. Integral image elements using reflective layers behind the integral image to enhance viewing of the integral image by reflected light, are also described in U.S. Pat. Nos. 3,751,258, 2,500,511, 2,039,648, 1,918,705 and GB 492,186.

While contact printing an original image, such as an original image, does not produce a print with as much degradation than might occur using an enlarger for printing, for example, it is not perfect. It is known that the light source used to illuminate the original image will not illuminate the original image completely uniformly. Typically, with a projection type light source, this means that the center of the print will tend to be darker (where the print is a negative). In an attempt to correct for this, a sequence of discrete filters has been used between the light source and original image, such that overall the sequence exhibits incremental decreases in density moving from the center to the periphery. However, this technique requires manually estimating the light intensity variance at the original image position, estimating a suitable filter sequence and then constructing it. Inherent errors in these steps will inevitably lead to poor correction for light intensity variance. Additionally, at the edges of the overlapping filters there will be a sudden drop in overall density and hence a sudden drop in light intensity. The same situation is present in other types of printers, such as photographic enlargers.

It would be desirable then, to provide a means for improving illumination uniformity at the original image position in a photographic printer, which is simple to implement and which does not produce at the original image position, edges across which there is a sudden variation in light intensity.

SUMMARY OF THE INVENTION

The present invention therefore provides a method of improving uneven illumination in a photographic printer having an original image position and a light source to illuminate the original image position, which method comprises in one aspect:

A method of improving uneven illumination in a photographic printer having an original image position and a light source to illuminate the original image position, and an exposure position at which a light sensitive element is positioned for exposure, wherein the exposure position may have an inherent non-uniform illumination absent the original image, the method comprising:

inputting into a computer, data representative of illumination at multiple laterally spaced locations positioned in a direction from the light source to the exposure position;

processing the data in the computer to form an illumination correction function with a visually indistinguishable resolution.

Additionally, the present invention includes the further steps of:

applying in the computer the illumination correction function to an original image signal so that when the original image is printed and positioned at the original image position, the inherent non-uniform illumination at the exposure position is reduced; and printing the corrected original image on a support.

Typically, the printed corrected original image will be positioned at the original image position of the photographic printer.

Additionally, the present invention provides a computer readable storage medium carrying program means. The program means includes any suitable computer readable program code which can be used by a computer to execute each of the steps of the present invention. An apparatus for executing the method of the present invention, is further provided.

The present invention then, provides in any aspect, a simple technique of improving upon illumination uniformity in a photographic printer. Upon exposure and processing in the photographic printer, the corrected original image automatically has densities adjusted so as to correct for the inherent non-uniform illumination. The use of the computer allows ready manipulation of the illumination data to generate the correction function, even though the illumination data may only be from a few points and may represent illumination at a different location than the original image position. Improved illumination uniformity at the original image position provides higher quality copies of images, including integral images, and is particularly beneficial where the original image includes a plurality of independent images (the copies of which are separated).

BRIEF DESCRIPTION OF THE DRAWINGS

To facilitate understanding, identical reference numerals have been used, where possible, to designate identical elements that are common to the figures.

EMBODIMENTS OF THE INVENTION

In the present invention, reference to an "inherent non-uniform illumination absent the original image" simply refers to any non-uniformities in the illumination which might result from any causes other than the image to be reproduced. The primary cause of such a non-uniformity is the printer light source itself. Also, reference to an illumination correction function having a visually indistinguishable resolution, refers to the function (which may be in the form of a table) having a sufficient resolution so that if the function alone was printed across a substrate the size of the original image position, the average (that is, 20/20 vision) unaided human eye would not be able to distinguish individual dots or pixels. Note that the function can be a series of density correction values or an equation representing relative density corrections across an area, and can therefore be printed. Of course, the printer used should have a sufficiently high resolution so that it does not itself cause the resolution of the printed function to be less than the stored function. Other acceptable resolutions could be used rather than visually indistinguishable, for example, the stored function may, when printed on a substrate size (for example, 8×10 inches, or even 2×3 inches) and on a printer of the types just discussed, may have have a resolution of at least 300×200 pixels, or even at least 600×400 or at least 1000× 1000 pixels. Alternatively, 300 dots per inch ("dpi") or 600 dpi could be used as the resolution. It will be appreciated from the description below though, that illumination measurements themselves need not be taken on the printer with such a high resolution, (although they could be) since the computer used can readily interpolate or extrapolate from a relatively few measurements to produce an illumination correction function of the required resolution.

Figure 1:
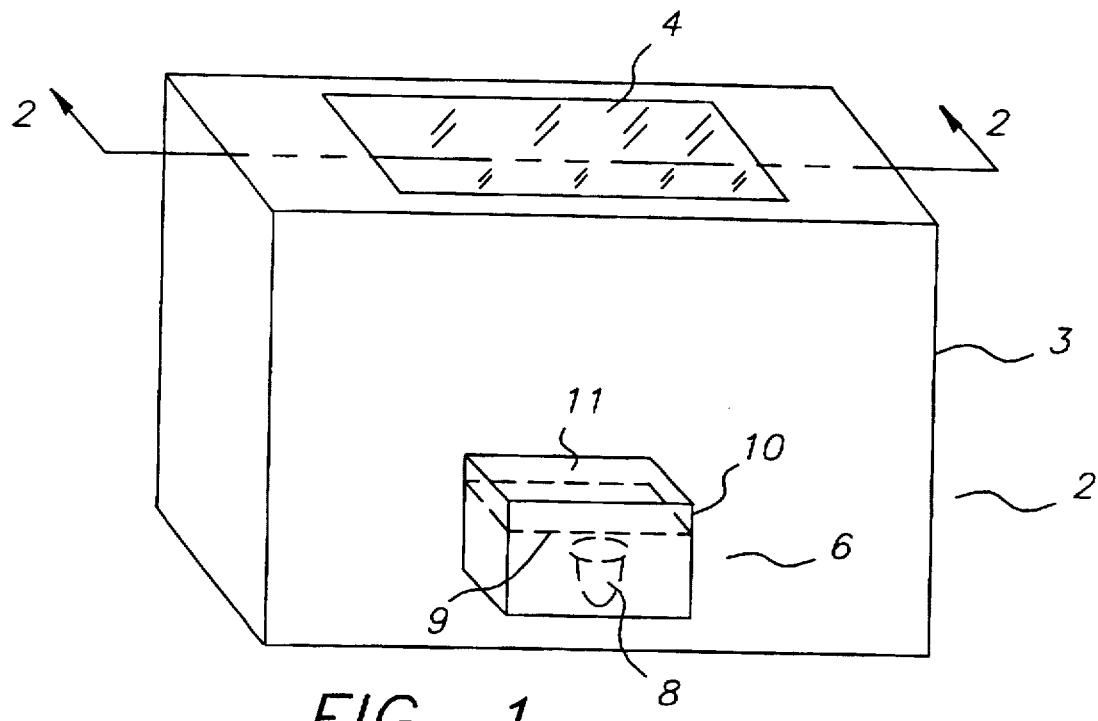
FIG. 1 is a perspective view of a contact printer using the method of the present invention.
Figure 2:
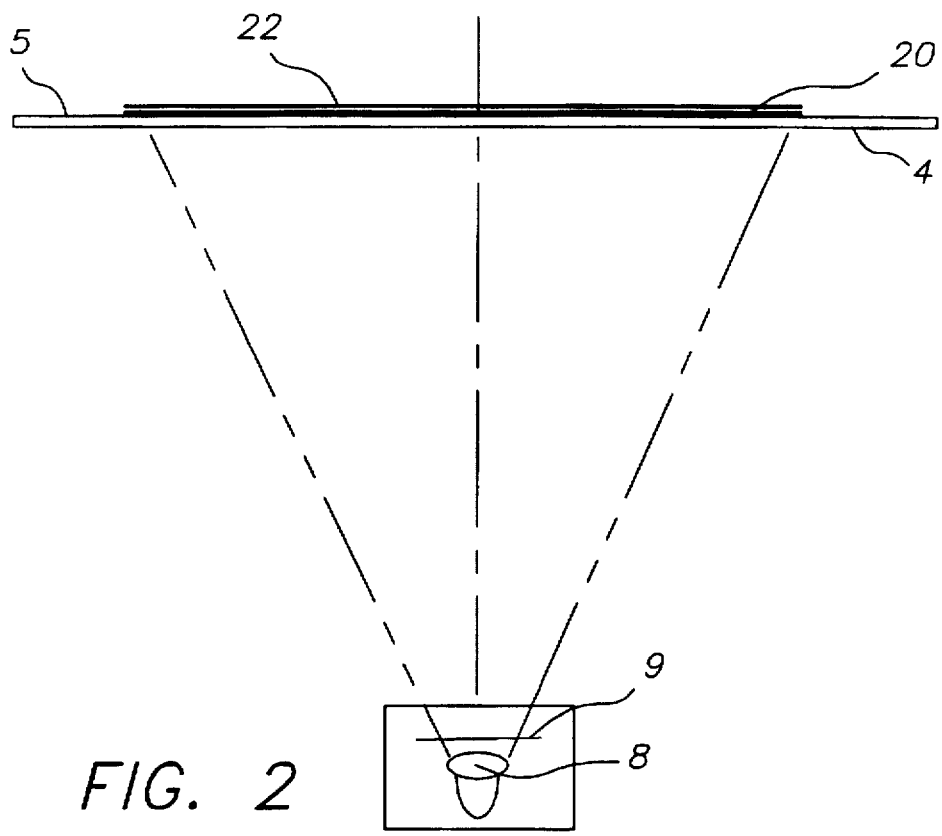
FIG. 2 is a cross-section along the line 2—2 in FIG. 1.

Referring now to FIGS. 1 and 2, the contact printer 2 has a printer housing 3 and a transparent glass platen 4 at an upper end of printer housing 3, an upper surface 5 of which platen 4 serves as an original image position. A light source 6 is positioned at a lower position inside printer housing 3. Light source 6 includes an electric lamp and reflector assembly 8, positioned inside a lamphouse 10. Lamphouse 10 is essentially completely closed except for an upper opening 11. One or more color and/or contrast filters, or other filters, may be present immediately above lamp and reflector assembly 8 at position 9. Light source 6 acts as a projection light source in that light from light source 6 diverges at an angle in the direction of platen 4, in a manner most clearly shown by the broken lines in FIG. 2.

Figure 3:
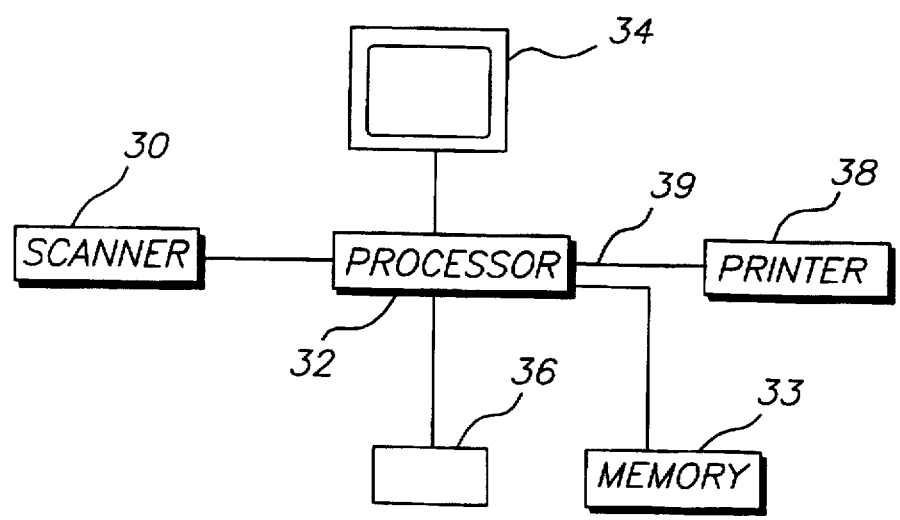
FIG. 3 is a block diagram of an electronic system for generating photographic images.

Referring to FIG. 3, this illustrates an apparatus for forming the digital correction profile function according to a method of the present invention. In particular, FIG. 3 shows a scanner 30 for scanning an exposed and processed photographic element and converting optical density measurements into digital data. Scanner 30 may be any conventional black and white scanner. A color scanner could also be used but is not required, although in this case scanner 30 could then also be the same scanner that is used to scan the original image (thereby obtaining the digital image data representing the original image). Scanner 30 is connected to a processor 32 which receives instructions for all steps to be executed in processor 32, from any suitable program code held in memory 33. Processor 32 is in turn connected to a monitor 34 and a user input device 36, such as a keyboard and/or pointing device (such as a mouse).

Processor 32, memory 33, monitor 34 and input device 36 may be components of a general purpose digital desktop computer programmed to execute the method described below. The programming may be provided to the memory 33 of the computer on any computer readable storage medium carrying the program. The computer readable storage medium may comprise, for example: magnetic storage media such as magnetic disc (such as a floppy disc or a hard disc drive) or magnetic tape; optical storage media such as optical disc, optical tape, or machine readable bar code; solid state electronic storage devices such as random access memory (RAM), or read only memory (ROM); or any other physical device or medium which might be employed to store a computer program.

A printer 38, preferably a film recorder, is connected to generate the corrected original image data from processor 32 and print the corrected original image on a transparency. Printer 38 can be any suitable printer, such as a black and white only printer, although color printers could be used (preferably which have a black dye for example black and white photographic film). Preferably a high resolution film recorder is used as printer 38 to avoid visible edges at which a noticeable drop in density might occur. One such suitable printer is an LVT printer available from Eastman Kodak Company, Rochester, N.Y.

In the method to be executed by the apparatus of FIG. 3, a photographic element is first exposed to light source 6 at some position in a direction of upper surface 5 (the original image position). Typically, the element will be exposed on upper surface 5. The exposed and processed element then, will carry data representative of illumination at multiple laterally spaced locations. These locations are all on the same plane of the element. However, it is not essential for such locations to be coplanar provided that data on their relative distance light source 6 is provided to processor 32, such as through input device 36 and processor 32 is programmed to compensate for the difference in relative distances. For simplicity, the element and processing are selected such that a negative image is formed. However, this is not necessary. It will be appreciated that provided a user indicates through input device 36 whether a negative or positive image is being provided, processor 32 can perform the necessary processing to form the corrected original image. Nor is it necessary that the processed element exhibit a gamma of 1 since a user can input the gamma value in input device 36 and processor 32 can be programmed to correct density data from scanner 30 based on the input gamma value. One of the advantages in using the method, is that regardless of how the illumination data is obtained and input to, processor 32 can be suitably programmed to compensate as necessary to still produce corrected original image which, when printed will reduce illumination non-uniformity at upper surface 5.

Processor 32 can receive the digital data from scanner 30 directly, as shown in FIG. 3, or alternatively the digital data could be first or later stored in a suitable memory (not shown) such as RAM, magnetic or optical memory devices. Processor 32 is suitably programmed to convert the illumination data into the required digital correction profile function based on factors already discussed, such as the locations from which the illumination data was obtained. In this regard it will be seen that another advantage of the method of the present invention is that processor 32 can enlarge or reduce the corrected original image size as required, using well known digital image processing algorithms, depending upon the relative locations at which the illumination data was obtained and the position at which the corrected original image will be used. These relative locations can be specified through input device 36.

The original image s(x,y) once processed to yield the corrected original image data generated by processor 32 can then be sent to printer 38 (again, preferably a film recorder) for printing on a suitable transparency (in the case of the preferred film recorder, a black and white silver halide film). The resulting corrected original image is then positioned in contact printer 2.

The corrected original image data on line 39 (going to printer 38) to produce the resulting density or transmittance values of the original image is generated by performing the steps steps outlined below. However, not all the steps need necessarily be performed in the order specified.

A test image is made using printer 38 following the same printing process as will be used to make the corrected original image from the data P(x,y). This test image comprises a series of test patches generated by specific data values, p, which cover a range of possible values that can be transferred to printer 38 on line 39. It is not necessary to have every possible value represented by a patch.

The test image that is printed using the same printing procedure that will be used for the final image, is measured. This process involves measuring the transmission, T, of each printed patch on the printed test image. The transmission value, T (defined as the ratio of light intensity coming from the test image at a given location x,y to the light intensity incident on the test image at the same location) is measured for each printed patch. These patch values are correlated with the value p on line 39 used to create the specific patch of measured T.

Using regression or trendline, bilinear interpolation, local inversion or interpolation, Newton, Conjugate or polynomial techniques a transfer function, $T_p(p)$, is created. $T_p(p)$ may be in the form of an equation or a look-up table. The transfer function derived from the relationship between the transmittance T at a patch in response to the specific data input values p on line 39 to print that location is defined as $T_p(p)$.

Input data corresponding to the non-uniformity of the intensity of illumination, I, across the platen is measured at discrete points located at positions x,y on upper surface 5 of platen 4. This input data for such positions is defined as I(x,y). Measurement of I(x,y) can be accomplished using any suitable device, such as photo-detectors, scanners, CCD cameras, or by exposing film which is then scanned. For some of these inputs it will be necessary to make a conversion from the measured value to intensity. It will be appreciated that having measured the intensity at the x,y points a smooth version of I(x,y) may be rendered by simply using bilinear interpolation or extrapolation or alternatively fitting through fitting a polynomial function to the points, as referred to further later. The minimum of I(x,y) is defined as $I_{min}$ and the maximum is $I_{max}$.

The corrected original image is calculated, and the corresponding printer values P(x,y)for each (x,y) location of the image, are computed by processor 32 using equation (1) below. The printer values for the corrected original image generated by processor 32 and passed on line 39 to printer 38 is:

$$P(x,y) = T_p^{-1}\left( \frac{K \cdot I_{min} \cdot T_p(s(x,y))}{I(x,y)} \right)$$

where K is a constant to provide a margin so that the printer 38 does not saturate, and $T_p^{-1}$ is the inverse of $T_p(p)$. Note that the digital image correction function is calculated simultaneously with the corrected digital image, the correction function being the $I_{min}/I_{(x,y)}$ component of the above equation. Also, note that the corrected original image is the result on the right hand side of equation (1) before applying $T_p^{-1}$. All of the required calculations can be readily executed in processor 32 which has access to the necessary program instructions in memory 33.

Illumination values for every point (x,y) will not likely actually be measured. In order to obtain a digital correction profile function without edges across which there are significant changes in transmission, for those positions at which illumination data was not measured, processor 32 can have suitable program code which can interpolate between, or extrapolate from, meausured illumination values or calculated printer code values. This interpolation/extrapolation could generate either I(x,y) values or be used to directly calculate P(x,y) values for those locations at which illumination values were not actually measured. Any such suitable program code then, acts as means for interpolating or extrapolating to obtain digital correction profile function image values at locations other than those for which data representative of illumination was obtained.

The printer data for the corrected original image, P(x,y), is next sent on line 39 to the printer 38 to print the original image.

Figure 4:
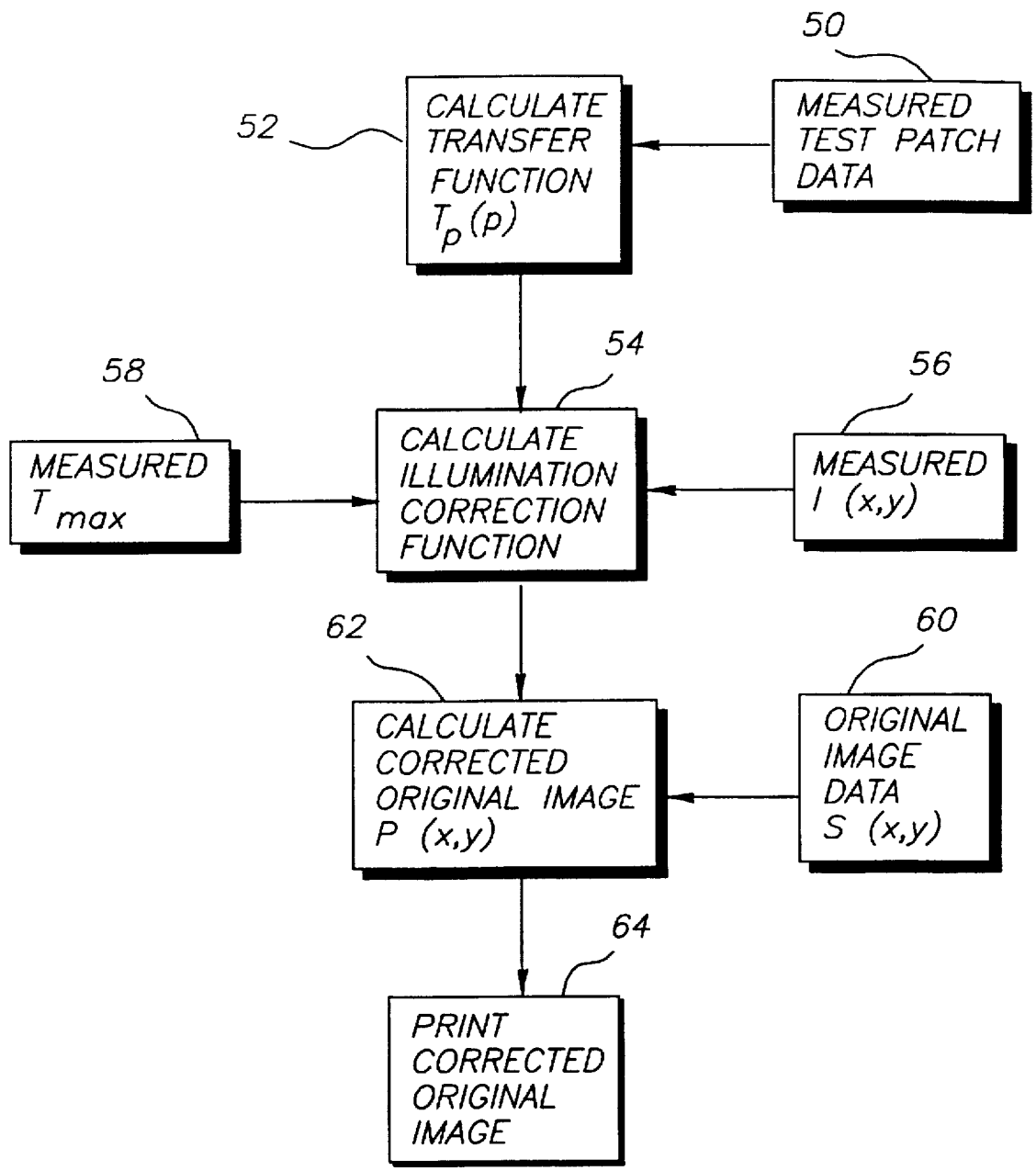
FIG. 4 is a flowchart illustrating a method of the present invention.

The foregoing overall procedure for obtaining the original image corrected for illumination non-uniformities in the printer is illustrated in the flowchart of FIG. 4. Test patch data including actual printer code values, p, and the corresponding measured transmittance values, T, of the printed test patches are inputted 50. These are used by processor 32 to calculate 52 the transfer function, $T_p(p)$, as described above. Measured I(x,y) values are inputted 58, 56 to processor 32. Data for an original image 60 of which copies are to be made, is also inputted into processor 32. The original image data may be, for example, digital image data obtained from scanning the original image from a hardcopy (such as a photographic element, that is a transparency, negative, or reflective print), or obtained from a magnetic or optical storage medium (such as a magnetic or optical disk or tape). The required illumination correction function and printer data values P(x,y) for the corrected original image are simultaneously calculated in steps 54 and 62 using equation (1) above. The corrected original image may then be printed 64. If interpolation/extrapolation of printer data values P(x, y) is required for locations at which illumination data was not obtained, these calculations can be done by processor 32 as part of step 54.

It will be appreciated (and as already mentioned) that in the method of determining the non-uniformity of intensity in the step above, the input illumination data can be obtained from any of a number of possible sources other than a scanner 30. For example, such data could be obtained by actual direct measurement with a sensor such as a photocell which is manually positioned at various defined locations across the illuminated upper surface 5 of platen 4 and intensity data being recorded of each position as input data which is keyed into processor 32 instead of using a scanner. Alternatively multiple photocells may be used. Another approach is to use a CCD array with an imaging optic or line sensor with suitable optics, or could be obtained by visually estimating illumination variances at the original image position. The data "representative" of illumination, then, may only provide relative illumination values. In cases where the illumination data obtained only represents data for a limited number of lateral locations within the light beam projected by light source 6 (such as might be obtained from photocells reading illumination at points on upper surface 5), processor 32 can be suitably programmed to estimate illumination data at other locations such as by extrapolation or interpolation, or from equations which describe the expected distribution of light.

It will be appreciated that, the present invention can be used for all variety of images including color and black and white as well as 2D, 3D and integral images. The particular application of printing integral images where even illumination and sharpness in the printed image are particularly important to produce a visually acceptable image will benefit considerably from this approach. Once the exposed element 22 has been processed to form a fixed print of the original image 20, it can then be aligned with a suitable integral lens sheet. While the integral lens sheet could be a fly's eye lens sheet it is more preferably a lenticular lens sheet with lenticules on the front surface (in which case the integral image would be a lenticular image). Alternatively, the integral lens sheet could have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plain which may be inherent in the lens construction. Consequently, the curvature on the back side may be the of such a shape as to match the curvature of the focal plain of the lens.

Figure 5:
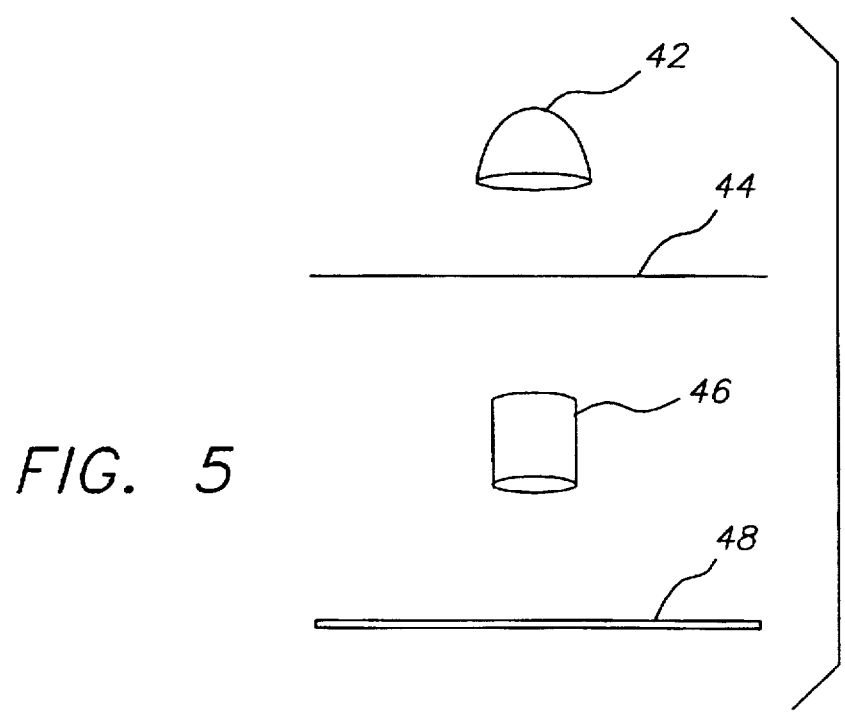
FIG. 5 is a perspective view of a photographic enlarger type printer using the method of the present invention.

It will also be appreciated that while the present invention has been described above particularly with regard to a contact printer, it can be applied to any other any type of photographic printer. For example, a photographic enlarger could be used as the printer. A photographic enlarger using the present invention is illustrated schematically in FIG. 5. In FIG. 5, light source 42 is directed through an original image 44 (held by an original image holder, not shown) to be copied, and then through a lens system 46, onto a light sensitive element 48 (retained in place by a copy holder, not shown, which may simply be a surface) on which the copy is to be made.

Further, as described above, by an "integral" image is referenced an image composed of segments (lines, in the case of a lenticular lens sheet) from at least one complete image (and often more than one image), which segments are to be aligned with respective individual lenses of an integral lens sheet so that each of the one or more images is viewable when a user's eyes are at the correct angle relative to the imaging element. The integral image can be one or more three-dimensional images, one or more two dimensional images, or any combination of the foregoing. By a "three-dimensional image", is meant an integral image which, when viewed through the lens, has a visible depth element. A depth element means the ability to at least partially look around an object in the scene. This can be obtained by interlacing lines from different perspective views of the same scene (that is, views from different angular positions with respect to the scene). Thus, a three-dimensional image necessarily includes at least two views of a scene. By a two-dimensional image is referenced an image which, when viewed in the final product, does not have any viewable depth element.

The invention has been described with reference to a preferred embodiment. However, it will be appreciated that variations and modifications can be effected by a person of ordinary skill in the art without departing from the scope of the invention.

| PARTS LIST | |
|---|---|
| 2 | Contact Printer |
| 3 | Printer Housing |
| 4 | Platen |
| 5 | Upper Surface |
| 6 | Source |
| 8 | Assembly |
| 9 | Position |
| 10 | Lamphouse |
| 11 | Upper Opening |
| 20 | Original Image |
| 22 | Element |
| 30 | Scanner |
| 32 | Processor |
| 34 | Monitor |
| 36 | Input Device |
| 38 | Printer |
| 39 | Line |
| 42 | Light Source |
| 44 | Original Image |
| 46 | Lens System |
| 48 | Light Sensitive Element |
| 50–64 | Steps |

I claim:

1. A method of improving uneven illumination in a photographic printer having an original image position and a light source to illuminate the original image position, and an exposure position at which a light sensitive element is positioned for exposure, wherein the exposure position may have an inherent non-uniform illumination absent the original image, the method comprising:

inputting into a computer, data representative of illumination at multiple laterally spaced locations positioned in a direction from the light source to the exposure position;

processing the data in the computer to form an illumination correction function with a visually indistinguishable resolution.

2. A method of improving uneven illumination in a photographic printer having an original image position and a light source to illuminate the original image position, and an exposure position at which a light sensitive element is positioned for exposure, wherein the exposure position may have an inherent non-uniform illumination absent the original image, the method comprising:

inputting into a computer, data representative of illumination at multiple laterally spaced locations positioned in a direction from the light source to the exposure position;

processing the data in the computer to form an illumination correction function;

applying in the computer the illumination correction function to an original image signal so that when the original image is printed and positioned at the original image position, the inherent non-uniform illumination at the exposure position is reduced; and printing the corrected original image on a support.

3. The method according to claim 2 additionally comprising positioning the printed corrected original image at the original image position.

4. A method according to claim 2 wherein the photographic printer is a contact printer.

5. A method according to claim 2 wherein the photographic printer is a photographic enlarger.

6. A method according to claim 2 additionally comprising printing a series of test patches of different optical density corresponding to data values sent to the printer, measuring the optical density of the printed test patches and determining as a density transfer characteristic the relationship between data values sent to the printer and the corresponding printed optical density.

7. A method according to claim 6 wherein the corrected original image, prior to printing, is formed as a series of printer data values which are a function of the data representative of illumination, the original image signal, and the transfer characteristic.

8. The method of claim 2 wherein the data representative of illumination is obtained from a sensor which measures illumination at multiple locations on the original image position.

9. The method of claim 2 wherein the step of inputting into the computer, data representative of illumination, comprises exposing to the light source a photographic element at a position from the light source in the direction of the original image position, and processing the element to form an image of the light source; and scanning the exposed and processed original image to obtain the data representative of illumination.

10. A method according to claim 9 wherein at least some of the data represent illumination at a distance from the light source which is different from the distance of the original image position from the light source, and wherein the step of processing the data to form the corrected original image adjusts the density of the original image as a function of the differences in the distances.

11. A method according to claim 2 additionally comprising exposing a light sensitive element to light passing through the printed corrected original image from the light source, to form a print of the original image on the light sensitive element.

12. A method according to claim 11 wherein the light sensitive element is positioned adjacent the printed corrected original image.

13. A method according to claim 11 wherein the original image is an integral image.

14. A method according to claim 13 wherein the integral image is a lenticular image.

15. A method according to claim 14 additionally comprising aligning the lenticular image print with a lenticular lens sheet.

16. A computer program product, comprising: a computer readable storage medium including program means which comprises:

means for receiving data representative of illumination at multiple laterally spaced locations positioned in a direction, in a photographic printer, from a light source of the printer to an original image position of the printer;

means for processing the data in a computer to form an illumination correction function;

means for applying in the computer the illumination correction function to an original image signal so that when the original image is printed and positioned at the original image position, inherent non-uniform illumination at the exposure position which is present absent the original image, is reduced;

means for causing a printer connected to the computer to print the corrected original image on a support.

17. A computer program product according to claim 16 wherein the means for processing includes means for interpolating or extrapolating to obtain illumination values at locations other than those for which data representative of illumination was obtained.

18. A computer program product according to claim 16 additionally comprising:

means for causing the printer to print a series of test patches of different optical density corresponding to data values sent to the printer;

means for receiving measured optical density values of the printed test patches and determining as a density transfer characteristic the relationship between data values sent to the printer and the corresponding printed optical density.

19. A computer program product according to claim 18 wherein the applying means forms the corrected original image, prior to printing, as a series of printer data values which are a function of the data representative of illumination, the image signal, and the transfer characteristic.

20. An apparatus for improving uneven illumination in a photographic printer having an original image position and a light source to illuminate the original image position, and an exposure position at which a light sensitive element is positioned for exposure, wherein the exposure position may have an inherent non-uniform illumination absent the original image, the apparatus comprising:

(a) illumination measuring means for obtaining data representative of illumination at multiple laterally spaced locations positioned in a direction from the light source to the exposure position;

(b) a programmed computer means connected to the illumination measuring means, for:

receiving the illumination data and processing the data to form an illumination correction function;

applying the illumination correction function to an original image signal so that when the original image is printed and positioned at the original image position, the inherent non-uniform illumination at the exposure position is reduced;

causing a printer connected to the computer to print the corrected original image on a support; and (c) a printer connected to the computer.

* * * * *

UNITED STATES PATENT AND TRADEMARK OFFICE
CERTIFICATE OF CORRECTION

PATENT NO. : 5,786,902
DATED : 28 July 1998
INVENTOR(S) : Roger R. A. Morton

It is certified that error appears in the above-identified patent and that said Letters Patent is hereby corrected as shown below:

On the title page, Item [57],
Abstract          Replace Abstract with following:

-- A method of improving uneven illumination in a photographic printer having an original image position and a light source to illuminate the original image position and an exposure position, wherein a light sensitive element is positioned for exposure. Further, the exposure position may have an inherent nonuniform illuminations absent the original image. This method includes inputting into a computer date representative of illumination at multiple laterally spaced locations positioned in a direction from the light source to the exposure position. This illumination data is processed in a computer in order to form an illumination correction function with a visually indistinguishable resolution. Finally, the illumination correction function is typically applied to an original image signal so that when the original image is printed and positioned at the original image position, the inherent non-uniform illumination at the exposure position is reduced. This corrected image is then typically printed on a support. --

Signed and Sealed this

Eighth Day of June, 1999

Attest:

Q. TODD DICKINSON

*Attesting Officer*          *Acting Commissioner of Patents and Trademarks*